June 24, 1969 L. M. SCHIPPERS 3,452,344
APPARATUS FOR CODING FILM AND RETRIEVAL OF THE SAME
Filed Nov. 4, 1966
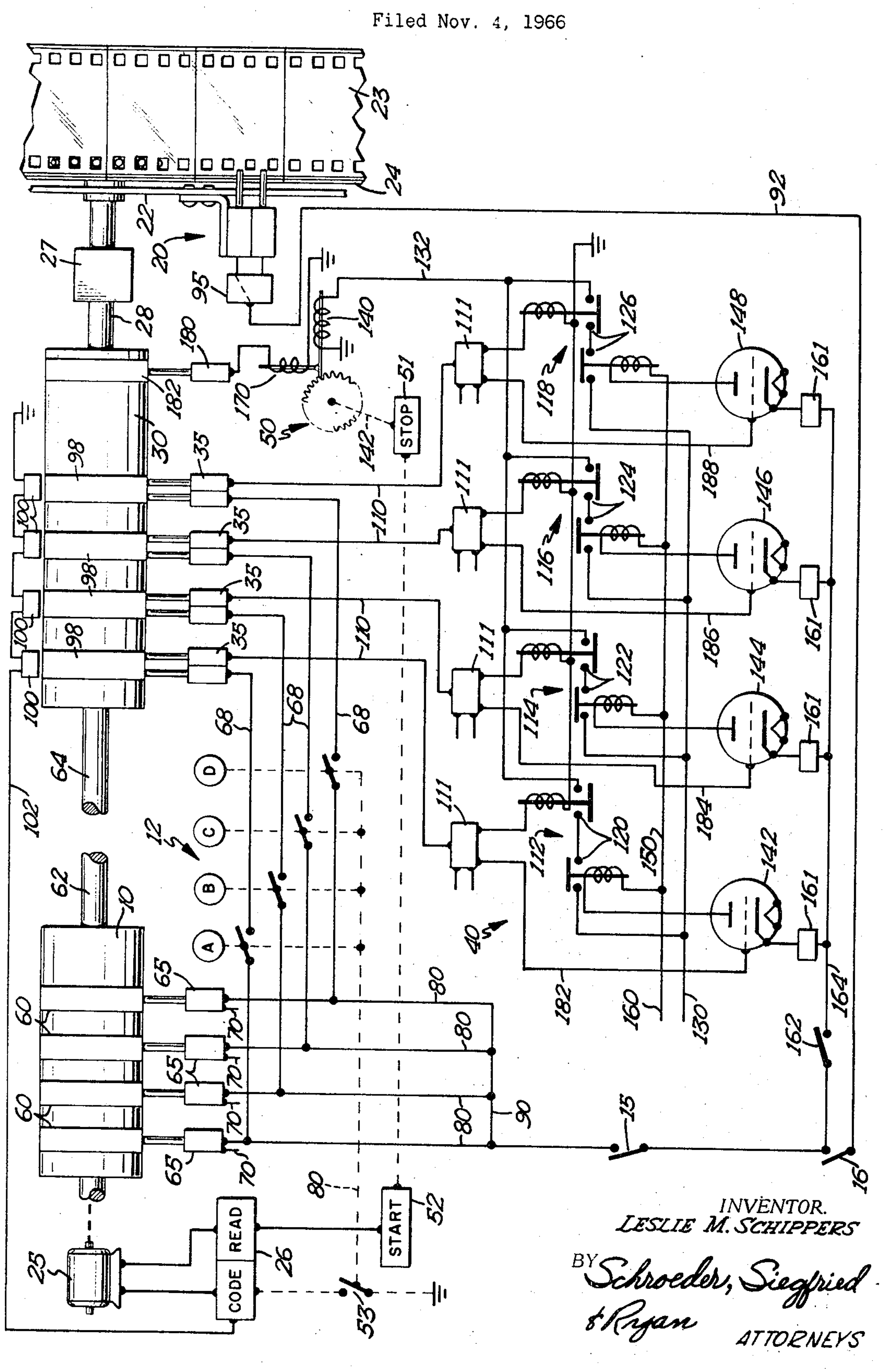
INVENTOR.
LESLIE M. SCHIPPERS
BY Schroeder, Siegfried & Ryan
ATTORNEYS United States Patent Office 3,452,344

Patented June 24, 1969

3,452,344
APPARATUS FOR CODING FILM AND RETRIEVAL OF THE SAME

Leslie M. Schippers, R.D. 1, Marine on St. Croix, Minn. 55047

Filed Nov. 4, 1966, Ser. No. 592,223
Int. Cl. G11b *5/00*
U.S. Cl. 340—174.1 9 Claims My invention relates to electro-mechanical apparatus for identifying microfilm and more particularly to a simplified and improved apparatus for coding of microfilm and the retrieval of the same.

Numerous methods and schemes have been devised for identifying articles and information on conveying systems and in data storage systems. It is accepted to address through code a device or film or tape, units or information which it is desired to locate at a later date. In the case of conveying systems, coded information will be read to direct articles and units in any desired manner, and in the case of data storage systems such as incorporated into computers, apparatus will review a mass of stored data by checking addresses and recall or retrieve certain data by locating the address identifying the same. Such systems are generally sophosticated requiring special logic apparatus and very complex electrical circuitry, shift registers and the like. In the field of document control and the storage of documents for the purpose of reuse at a later date, there is no simplified and economical way such documents can be readily reproduced on film for simplified storage and yet readily recalled for usage when necessary. The present apparatus is directed to a simplified arrangement for coding microfilm upon which has been placed various documents and information which it is desired to store in film form so that the originals may be destroyed and storage problems of the same eliminated. This improved apparatus includes in addition a simplified arrangement of recalling the proper microfilm frame through identification of its address or code through a simplified electrical and mechanical arrangement for driving the microfilm. This simplifies the arrangement of handling the microfilm for later usage and permits a vast storage of records without complex machines.

The present invention provides an apparatus in which a source of reference signals, either electric or magnetic will be selectively impressed on a magnetic strip edge of a microfilm in a fixed spatial sequence and over given extents of the microfilm and in terms of distinguishable magnetic signals to code an address on the microfilm for the purpose of facilitating retrieval of the same and selection of a desired frame of microfilm at a future date. This apparatus includes the circuit and a simplified magnetic recording head and reading head which will enable the signals to be placed on the microfilm and removed therefrom. In conjunction with the recording and reading of the magnetic signals on the microfilm, the signal source will also impress similar signals or the same signal on a memory storage drum having a magnetic surface thereon with the separate distinct signals being spaced on the microfilm in parallel paths and spatially or axially from one another to identify the address. The magnetic storage drum and the film carrier system for the microfilm are connected through a common drive to maintain a fixed spatial relationship with the magnetic storage drum being geared to the film carrier system so that it may be read or recorded upon over its entire surface during the same period in which a single frame of microfilm is scanned or recorded upon. A suitable drive system will provide pulsed or stepped movement of the film carrier system and magnetic storage drum during the record function and continuous rotation in the read function. Whenever it is desired to retrieve a particular frame of microfilm, its address or code is first impressed on the magnetic storage drum and thereafter a circuit is set up which will receive the signals read from the film simultaneously with the signals read from the magnetic storage drum. A simplified logic system with a dual input will read and compare the signals from the two sources and will operate in associated control whenever the particular coded address on a frame of microfilm corresponds with the desired address impressed on the magnetic storage drum to stop the film carrier system at the frame of microfilm bearing the desired address. This simplified apparatus provides a low cost arrangement for storing and retrieval of information on film.

Therefore it is the principal object of this invention to provide a simplified apparatus for coding of film and the retrieval of the same.

Another object of this invention is to provide in apparatus of this type, a simplified retrieval system which incorporates a simplified logic system having a magnetic memory associated therewith to facilitate selection of a desired address or frame of microfilm.

A still further object of this invention is to provide in apparatus of this type a simplified arrangement of rotating parts to provide for spatial correspondence between the film carirer system and the memory storage system.

Another object of this invention is to provide in apparatus of this type a memory drum on which a coded address is placed at the time it is desired to retrieve a frame of film having the same address with the memory drum being scanned along with the film until correspondence is obtained between the memory drum and the address on the film.

A further object of this invention is to provide apparatus of this type with a simplified logic system.

A still further object of this invention is to provide an apparatus for coding of film and the retrieval of the same which is low in cost and easy to use and maintain.

These and other objects of this invention will become apparent from a reading of the attached description together with the drawings wherein the improved apparatus is shown in schematic form.

Generally, this apparatus for the coding of microfilm and the retrieval of the same incorporates some form of transmitter indicated generally at 10, which through a plurality of selectively operated switches will provide separate and discrete signals of the electrical type to be fed to a composite, record and read head 20 positioned adjacent and scanning the magnetic surface 24 of the plurality of frames of microfilm 23, the magnetic surface being positioned on the edge thereof. The microfilm is carried by a film carrier system, indicated generally at 22, and is adapted to be moved through a suitable drive system, driven by a motor 25 and controlled through a suitable control apparatus or switching control 26. The electrical signals are connected through a circuit to be specifically identified hereinafter and are selectively connected to the record head 20 through switches 15 and 16. The drive system for the film system includes a mechanical coupling 27 operating on a shaft 28 which also mounts a magnetic memory drum 30 having a plurality of strips of magnetic material or surfaces thereon separate from one another. Associated with the memory drum 30 are a plurality of read and record heads 35 each positioned adjacent to the memory drum and scanning one of the plurality of parallel paths or surfaces upon which coded signals are placed, as will be hereinafter identified. In the retrieval of coded information, the desired address or coded sequence is first placed on the memory drum, and then the drive system through the motor 25 is operated through a continuous rotation so that each frame of microfilm in a roll may be scanned in sequence and the coded information thereon compared with the desired address on the memory drum. A logic system, indicated generally at 40, makes such a comparison and operates a resulting controller 50 operating a stop switch 51 which stops the motor 25. Both the stop switch 51 and a start switch 52 operate in conjunction with the read portion of the control 26 to operate the motor. A similar control 53 in the form of a switch operating in conjunction with each of the plurality of switches 12 from the transmitter provides for pulsed operation of the motor in the coding of the microfilm, as will be hereinafter identified.

The transmitter 10 is shown herein as a drum having a plurality of strips of the magnetic material 60 positioned thereon. Various surfaces on the strips are coded with spaced magnetic pulses or increments to provide a source of magnetic signals which are separate and distinct from one another for the purpose of coding the microfilm. The drum 10 is carried on a shaft 62 connected to the shaft 64 mounting the memory drum and common to the drive shaft 28 of the film carrier system. The shafts 62 and 64 provide a direct connection and are adapted to be connected to the motor 25 through suitable gearing (not shown). Associated with the strips of magnetic material having permanently magnetized increments or spots thereon are a plurality of read heads 65 which scan the respective magnetic surfaces continuously with rotation of the transmitter drum 10. Also associated with the read heads are the plurality of switches 12 which may be manually operable or may be operated through suitable associated control means, such as punch cards or the like. Each of the record heads is connected through one of the switches 12 to selectively connect the record head into a plurality of circuits 68 separate and distinct from one another. The opposite control conductor is adapted to be connected to a common circuit, indicated by the numeral 70. Whenever a desired address is to be taken from the transmitter, the switches 12 will be operated in a predetermined sequence to provide a particular code or address to be taken from the drum. The switches 12 have a common mechanical connection, indicated by the dotted line 80, to the start switch 53 and connected into the code portion of the control 26 controlling the energization of the motor 25. This will provide pulsed operation of the motor with the motor rotating the drum only over a given angular distance. Similar rotation will be imparted to the memory drum. The film carrier system is connected to this common drive through the shaft 28 and the coupling or gearing 27 which reduces the drive speed for the film carrier system, so that the memory drum and transmitting drum will move through one complete rotation as the film carrier system advances a piece of microfilm through a distance of one frame. In the coding operation, signals in the conductors 68 will be fed through conductors 80 in a stepped sequence, the record heads having sensed the magnetic signal and provided electrical voltage output signals in accord with the magnetic spots scanned. The magnetic signals are made separate and discrete or distinguished from one another by virtue of a given number of magnetic spots over a predetermined length of the film surface corresponding to the movement of the drum in one step of operation. Thus the magnitudes of the magnetic signals sensed by the read head or heads 65 will vary and these heads will produce pulsed voltage signals of differing magnitudes of pulses for each of the sets of magnetic spots over a given range of drum movement. The conductors 80 are connected in common as at 90 and through switches 15 and 16 to a conductor 92 leading to a selective switch 95 which will connect the read or record portion of the magnetic head 20 associated with the film strip. The magnetic edge surface 24 on the film will have impressed thereon the same series of magnetic spots for a given film length to make up one increment or coded unit of the address. Thus the film may be addressed by selectively connecting any one of the switches in a predetermined order with each switch operation operating also the start switch 53 to pulse the motor 25 and rotate the transmitting drum and the memory drum a given distance with the film carrier system moving a corresponding distance. This will provide one increment of space on the magnetic track of the film edge on which a desired coded unit will be impressed.

A particular address will be made of 4 or more such units or sets of such units. I have shown herein for simplicity only, four switches and four sets of magnetic material on the memory drum and the transmitting drum. Such a unit with four switches will provide in sets of four unit signals some 256 different combinations of addresses for a roll of microfilm, for example. As the numbers of units are increased and the number of address increments are increased, a significantly larger number of separate addresses or coded bits of information are provided together with space for coding additional information relative to the material stored on the film. The conductors 68 are also connected in common wtih the respective record portions of the heads 35 on the memory drum 30 which will also receive the pulse from the transmitter 10 at the time the address is impressed on the film 24. Thus the address will be printed magnetically on the memory drum over the extent of its periphery and on the separate bands indicated generally at 98 thereon. Suitable erase heads 100 associated therewith will be energized during the coding operation such as is indicated by the electrical conductor 102. Thus such a signal will be wiped off after a complete rotation of the memory drum 30. In this manner, the particular addressed information for a series of strips or frames of microfilm or addresses will be put on and wiped off the memory drum 30 without affecting operation of the apparatus.

A plurality of conductors 110 are connected respectively to the read portion of the read heads 35 on the memory storage drum. These conductors 110 include suitable amplifying units, indicated schematically at 111, the outputs of which lead to the logic network 40 to provide one signal input path thereto. The logic circuit is shown in its simplest form herein as a plurality of pairs of relays 112, 114, 116 and 118 respectively with the contacts of these relays 120, 122, 124 and 126 being connected in series circuit and to a power source 130 at one extremity and in common to a conductor 132 at the opposite extremity leading to the electromagnetic coil 140 of the sensing actuator 50 shown here as a rachet mechanism mechanically coupled through the dotted connection 142 to the stop switch 51 for the motor controller 26. One of the pairs of relays of each of the sets is connected respectively to one of the amplifying units 111 in the respective conductors 110 leading to the memory storage drum and the separate record heads thereon. The second of the pairs of relays are connected respectively to vacuum tube type controllers 142, 144, 146 and 148 respectively at the plate circuits thereof with the opposite extremities of the coils, being connected in common as indicated by the conductor 150 and to a power supply indicated at 160. The cathode circuits of these transmitters are connected respectively to integrating type controllers 161 respectively to take the pulsed electrical signals and integrate them over the given increment of time indicative of one unit of signal to provide a voltage output level at the cathode indicative of the particular magnetic signal sensed. These controllers are connected through the switch 162 and conductor 164 to the switch 16 and conductor 92 leading to the record and read head 20 of the film carrier system. This latter circuit provides a second input to the logic network 40 and the magnitude or number of pulsed increments sensed and the voltage signals accumulated in the integrating type circuit 161 will determine which of the vacuum tubes 142, 144, 146 or 148 will operate. To set such circuits, and to properly operate the relays of the pairs forming the "and" portion or logic portion of the network, the amplifying devices 111 are included in the conductors 110 leading from the magnetic memory drum. These amplified signals are connected through separate conductors such as is indicated at 182, 184, 186 and 188 which will adjust the bias level on the grids of the respective vacuum tubes so that the integrated voltage signal on the cathode will operate that tube corresponding to the correct addressed increment. Thus spatially, the magnetic storage drum and the carrier system for each frame are aligned and moved together so that the angular displacements of the driving shafts will cover a constant distance for each frame of microfilm and each corresponding portion of that surface in which a magnetic signal is positioned.

Thus upon retrieval of the coded film from a series of frames, the address is first impressed on the magnetic storage drum with the switch 16 open so that such magnetic signals or electrical signals will not be applied to the record head 20 to affect the magnetic strip 24 on the film. As such, signals are impressed on the magnetic storage drum, and they are placed in positional alignment with given portions on the drum surface so as to correspond with given portions of the magnetic strip on the edge of the microfilm. The next step in the retrieval operation is to switch the apparatus to the record function in which case the switch 15 will be opened and the switch 162 closed with the switch 95 operated to the read portion or circuit of the magnetic head scanning the microfilm. The controller 26 in the read position will drive the motor at a constant speed continuously as distinguished from the pulsed mode of operation during coding in which the magnetic storage drum and transmitter were moved only given distances corresponding to a space in which a given increment of the magnetic signal was transmitted or recorded. With the mechanical connection between the drum 30 and the film carrier system 22 the magnetic storage drum is rotated through a single revolution during movement of the film carrier system to advance the microfilm the distance of one frame. Thus the read portion of the head 20 for the film carrier system will scan the magnetic strip portion 24 of each frame and sense the various address signals or units thereof. These units will be distinguished by the number of magnetic spots or increments impressed in a given distance over the edge of the film. The read head will transmit through the conductor 92 to the input on the logic circuit through the integrating inputs 161 thereof and to the plurality of tubes 142, 144, 146 and 148. As such signals are scanned and the entire surface of the magnetic storage drum 30 will be scanned and the magnetic band 98 with the coded address signals thereon will be read by the read portions of the plurality of heads 35 associated with the respective bands 98. These signals will be connected or transmitted through the conductors 110 to the input of the logic circuit to be amplified by the amplifying equipment 111 and operate in a predetermined sequence one coil of each of the pairs of relays 112, 114, 116 or 118. Whenever there is positional agreement or spatial agreement between the signals sensed from the magnetic storage drum and a signal received from the film carrier system or the magnetic strip edge of the frame of microfilm, the resetting circuit will have adjusted the bias on one of the respective tubes to allow one of the tubes to fire. Such a tube will have voltage agreement or compatibility between grid and cathode should the cathode receive the proper input signal. The bias levels are adjusted so that the higher magnitude output signals from the integrators will not fire all of the tubes. Since the time agreement is required, only one set of relays of the pairs will be energized simultaneously supplying a circuit from the common power supply 130 to the common conductor 132 and the coil 140 of the actuating mechanism for the controller 50 operating the stop circuit. Whenever the stop mechanism has been operated a predetermined number of times indicative of the agreement between signals on the magnetic storage drum and on the particular frame of microfilm, the controller 50 will operate to trip the switch 51 stopping the motor circuit. This will have brought the desired frame of microfilm for which the address was impressed on the magnetic storage drum into a position where it can be viewed and utilized. For every other frame in the sequence, there will not be positional agreement between he various signals on the magnetic storage drum and those on the film so that such operation will not take place. With each frame of microfilm, if a desired number of pulses are not obtained by the controller 50 it will retract to its original position. A suitable trip coil 170 energized from a read head 180 associated with a band 182 on storage drum 30 having a trip pulse permanently coded thereon at the end of the active signal portion of the drum, will operate to reset the controller 50. Thus the logic system resets itself from the magnetic storage drum, after each revolution. It also presets itself to read for given positions on the film and hence given positions on the magnetic storage drum, a particular signal. If this does not agree with this signal on the magnetic storage drum, the respective or appropriate vacuum tube will not operate and hence the pairs of relays will not be simultaneously operated to provide the switching operation necessary to stop the controller 50 or energize its coil 140.

While I have shown a simplified transmitter in the form of a magnetic source having a plurality of differently polarized magnetic strips thereon, it will be recognized that an electrical signal source may replace this portion of the apparatus with pulsed electrical signals of given magnitudes being supplied to the conductor 68 to magnetize the magnetic storage drum and print a magnetic signal on the microfilm. In this improved apparatus the desired address is first placed on the film through operation of a switching mechanism such as is indicated by the switches 12 in a predetermined sequence. Operation of any one of the switches will cause the film carrier movement and magnetic storage drum movement over a constant and given step of movement. Thus the time differential between each switch operation is immaterial and the proper sequencing and spacing of the signals on the film and on the magnetic storage is fixed. Such switch operation may be controlled from punch cards or typewriter type controllers if desired. With the impression of signals on the microfilm, this circuitry permits similar signals to be placed on the magnetic storage drum which signals are erased if not used as long as the apparatus remains in a coded mode of operation. Whenever it is desired to retrieve a frame of microfilm, the proper address is again placed on the magnetic storage drum with the circuit open to the record head of the film carrier system so as not to disturb the previously addressed information on the magnetic strip for the mcirofilm. Once the desired information or address is placed on the magnetic storage drum 30, the switch 15 is opened and switches 16 and 162 are closed so that the two input circuits to the logic network are completed. Thereafter the controller 26 for the drive apparatus of the simplified system is moved to the read mode of operation providing continuous and constant speed operation so that the magnetic storage drum will be scanned for each frame of microfilm. During this period of time the erase heads 100 are de-energized so as not to disturb the address positioned on the magnetic storage drum. A comparison is made between the signals on each frame of microfilm with the signals on the magnetic storage drum with the spatial agreement with each frame of microfilm and the magnetic storage drum so that whenever the same signal occurs on each, the logic network will respond with a pulsed operation to the controller 50 operating the stop mechanism. Whenever all units making up the code correspond, the actuator or controller 50 will have operated through such a sequence as to operate the stop mechanism 51 and the retrieval of he desired frame of microfilm will have been completed. If such is not completed for a frame of microfilm to stop the drive, the controller 50 is reset for operation by the logic system on each succeeding frame.

It will be recognized that the vacuum tube and relay portion of the logic network may be replaced by similar transistor units and shift registers with the same being true for the integrating portion of the input stage for the logic network. Similarly the relay combinations are equivalent of "and" units conventionally used in computers.

Therefore in considering this invention it should be remembered that the present disclosure is intended to be illustrative only and the scope of the invention should be determined by the appended claims.

What is claimed is:

1. Apparatus for coding film and retrieval of the same, comprising: a film carrier and drive system, a strip of film having a plurality of separate frames therein with an edge extending continuously along the film from frame to frame with a magnetic material thereon capable of receiving and storing a composite magnetic signal made up of discrete magnetic increments spaced along said magnetic edge for each frame to identify the frame of film, said film being positioned on the film carrier and drive system to be moved thereon, magnetic head means for recording and reading magnetic signals and transposing them to and from electrical signals positioned on the film carrier system fixed relative to the film thereon and adjacent the magnetic edge to record and read magnetic signals on the film, a memory storage drum having a magnetic surface thereon, magnetic head means for reading and recording magnetic signals on the storage drum positioned adjacent the magnetic drum and adapted to record and read magnetic signals on the magnetic drum in spaced parallel paths indicative of differing discrete magnetic signals, means coupling the film carrier and drive system with the magnetic storage drum for simultaneous movement, drive means coupled to the film carrier system and memory storage drum for driving the same, a signal source having a plurality of discrete signals of differing character, switching means for selecting from said source signals of differing character, circuit means including said switching means connecting the signal source to the magnetic head means of the film carrier system, additional switching means connecting the signal source including said switching means to the magnetic head means for the memory storage drum, and logic circuit means including a dual input circuit, one input of which is connected to the magnetic head means of the magnetic storage drum and the other of which is connected to the magnetic head means of the film carrier system to receive input signals from said respective magnetic head means, means coupled to and responsive to the input signals at said dual input circuits of the logic circuit to respond to simultaneous signals of the same discrete magnetic character from the magnetic head means of the magnetic storage drum and the film carrier system and in a predetermined sequence from said storage drum and said film carrier system to provide a predetermined signal output, and means responsive to the predetermined signal output of the logic system connected to the means for driving the memory storage drum and film carrier system to stop rotation of the same.

2. The apparatus for coding film and retrieval of the same of claim 1 in which the memory storage drum rotates at a speed through the coupling means at a single revolution for each movement of film on the film carrier system through the drive system therefor of one frame on the film.

3. The apparatus for coding film and retrieval of the same of claim 2 in which the magnetic head means for the memory storage drum includes a plurality of heads with read and record portions each operative to record and read magnetic signals of different characteristics and the magnetic head means for the film carrier system is a single head with a read and record portion.

4. The apparatus for coding film and retrieval of the same of claim 3 in which the drive means includes a motor and a switching control in which the motor will operate with continuous rotation for reading the magnetic signals on the magnetic storage drum and the film and will operate in a stepped operation for record control.

5. The apparatus for coding film and retrieval of the same of claim 4 and including selective switching means connected to the signal source for selective varying of the signals of different character to supply them in electrical form to the record head of the magnetic storage drum and the head of the film carrier system.

6. The apparatus for coding film and retrieval of the same of claim 5 in which the signal source is a drum having a plurality of magnetic surfaces thereon which are polarized to provide magnetic signals and in which the signal source includes read means operated through the selective means to provide the signals of different characters to the magnetic storage drum and the film carrier system.

7. The apparatus for coding film and the retrieval of the same of claim 6 in which the means coupled to and responsive to input signals at the dual input circuit of the logic circuit includes a plurality of pairs of relays each pair having contact means connected in a series circuit and to the means responsive to the predetermined signal out of the logic system, one of said relays of each pair being connected to the read portion of the respective magnetic heads of the memory storage drum associated with the magnetic bands thereon for the separate and discrete magnetic signals, the other of said relays of each pair being connected to amplifying and discriminating means responsive respectively to different magnitude signals from the read head of the film carrier system.

8. The apparatus for coding film and retrieval of the same of claim 4 in which the logic system includes a plurality of "and" type switching elements connected respectively to the dual input circuits with a separate input circuit for each type of discrete magnetic signals received from said memory storage drum and said film carrier system.

9. The apparatus for coding film and retrieval of the same of claim 7 in which the logic system includes circuit connections between the input circuits to time sequence the input circuits.

References Cited

UNITED STATES PATENTS

| | | | |
|---|---|---|---|
| 2,875,436 | 2/1959 | Hammond | 340—74.1 |
| 2,879,126 | 3/1959 | James | 346—74 |
| 3,118,135 | 1/1964 | Tomek et al. | 340—174.1 |
| 3,196,420 | 7/1965 | Francois | 340—174.1 |

BERNARD KONICK, *Primary Examiner.*

V. P. CANNEY, *Assistant Examiner.*